July 28, 1942.　　A. H. HOLSTENSSON ET AL　　2,291,158
TALKING MACHINE FOR PLAYING A PLURALITY OF RECORDS IN SUCCESSION
Filed Sept. 23, 1938　　6 Sheets-Sheet 1

INVENTORS
A. H. HOLSTENSSON
S. P. ARVIDIUS
BY Young, Emery & Thompson
ATTYS.

July 28, 1942. A. H. HOLSTENSSON ET AL 2,291,158
TALKING MACHINE FOR PLAYING A PLURALITY OF RECORDS IN SUCCESSION
Filed Sept. 23, 1938 6 Sheets-Sheet 5

INVENTORS
A. H. HOLSTESSON
S. P. ARVIDIUS
BY Young, Emery & Thompson
ATTYS.

July 28, 1942. A. H. HOLSTENSSON ET AL 2,291,158
TALKING MACHINE FOR PLAYING A PLURALITY OF RECORDS IN SUCCESSION
Filed Sept. 23, 1938 6 Sheets-Sheet 6

INVENTORS
A. H. HOLSTENSSON
S. P. ARVIDIUS
By Young, Emery & Thompson
ATTYS.

Patented July 28, 1942

2,291,158

UNITED STATES PATENT OFFICE 2,291,158

TALKING MACHINE FOR PLAYING A PLURALITY OF RECORDS IN SUCCESSION

Axel Harald Holstensson and Svante Philip Arvidius, Motala, Sweden; said Arvidius assignor to said Holstensson Application September 23, 1938, Serial No. 231,416
In Sweden September 23, 1937

14 Claims. (Cl. 274—10)

The present invention relates to talking machines for playing a plurality of records in succession and more particularly to the type of such talking machines in which a stack of records to be played is supported above the turntable and a mechanism is provided which upon completion of the playing of a record automatically raises the arm carrying the sound box or pick-up from said record, swings the same outwards, brings the next record in the stack to fall downwards to the turntable and moves said arm back to a position for playing the new record.

The chief object of the present invention is to provide an improved talking machine of this general type which permits records of different sizes to be played automatically, i. e., in which the stack of records supported above the turntable may contain records of different diameters indiscriminately mixed.

Talking machines of this type exist already in which the problem of enabling the automatic playing of records of different sizes has been solved by providing a number of feelers pivoted in a bridge structure which spans the turntable, said feelers extending radially inwards over the turntable so as to be in the path of downward travel of the records to be released in sequence from the stack above the turntable. When these feelers are actuated by a falling record they yield, i. e., they are rocked about their pivots enough to permit the record in question to pass on to the turntable. This rocking movement being different for records of different sizes is caused to actuate in a suitable manner the mechanism for effecting the movements of the pick-up or tone arm so that the same is always stopped in the correct position at the return.

The above described known device suffers from several disadvantages. The feelers of which there should be a plurality in order that the records should not fall obliquely constitute a hindrance to the removal of the stack of played records from the turntable. Therefore, it has been proposed to introduce special means for raising or lowering the feelers. These means involve a complication of the mechanism and increase its price. Furthermore, the feelers due to their location are liable to be bent or deformed so as not to function as intended.

According to the present invention an improved mechanism is obtained by providing adjacent to the side of the stack of records from which the records are released in a known manner by being displaced laterally, i. e., in their own plane, a member which is actuated by the record being released at the lateral displacement thereof if the record is a relatively large one but remains unaffected if the record is a relatively small one, the lateral displacement of the record in the latter case being insufficient for the record to reach the said member, and the said member being adapted to actuate the mechanism for effecting the movements of the pick-up or tone arm.

Several advantages arise from this construction. One advantage is that only one member to be actuated by the records is needed and that in spite hereof the records will be deposited in a truly horizontal position on the turntable so that breakage is avoided. This one member is located at the side of the turntable and does not extend inwards over the same. Therefore, it does not obstruct the removal of played records from the turntable and is not liable to be bent or deformed. According to a further feature of the present invention supporting means for the stack of records to be played are constructed such that they can be moved from an operative position in which they engage the uppermost record in the stack above the turntable to an inoperative position in which they do not extend above said turntable. This feature in connection with the location of the above-mentioned member to be actuated by the released records makes that the turntable is freely accessible from above after the supporting means have been moved to the inoperative position. A further advantage is that the force with which the said member is actuated is independent of the weight of the record and substantially the same for light and heavy records. This ensures reliable operation.

In order that the invention may be clearly understood and readily carried into effect, one mechanism constructed in accordance therewith will now be described by way of example with reference to the accompanying drawings, in which.

Figure 1:
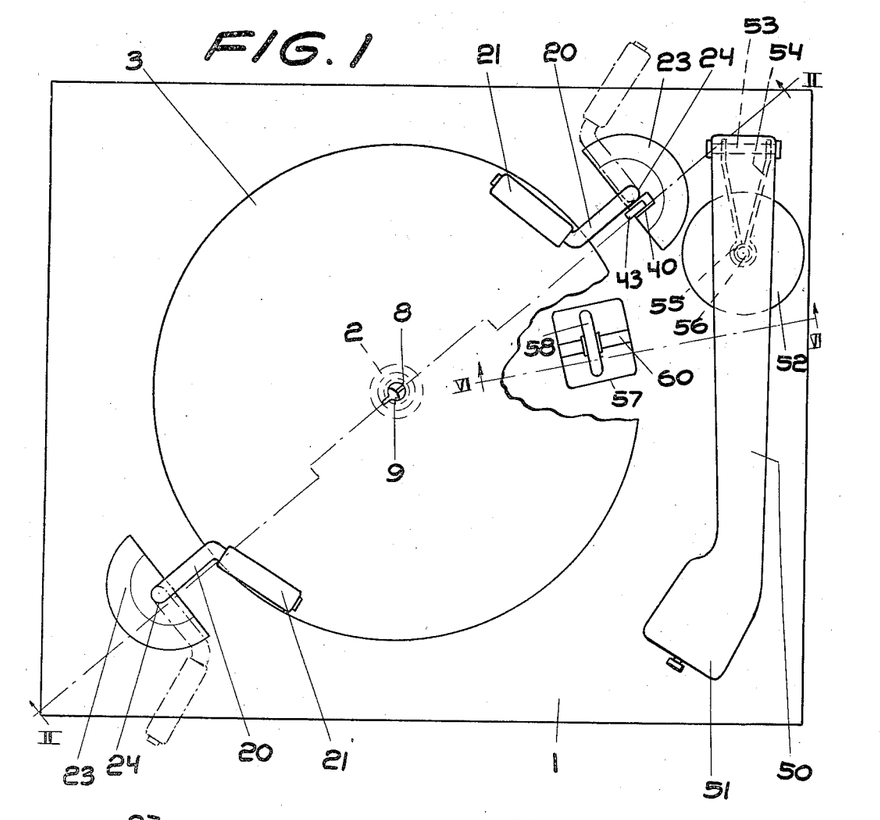
Fig. 1 is a plan view of the talking machine with part of the turntable broken away.

In the drawings 1 designates a base or platform above which a turntable 3 is removably mounted on a vertical hollow shaft 2. The shaft 2 (Figure 2) is journalled in the platform 1 and in a lower support or plate 4 and is driven by an electric motor 5 by means of a worm 6 and a worm wheel 7 which latter is mounted on the shaft 2. The motor 5 is screwed to the underside of the platform 1 and is assumed to carry the above mentioned plate 4.

Figures 2, 4, 5:
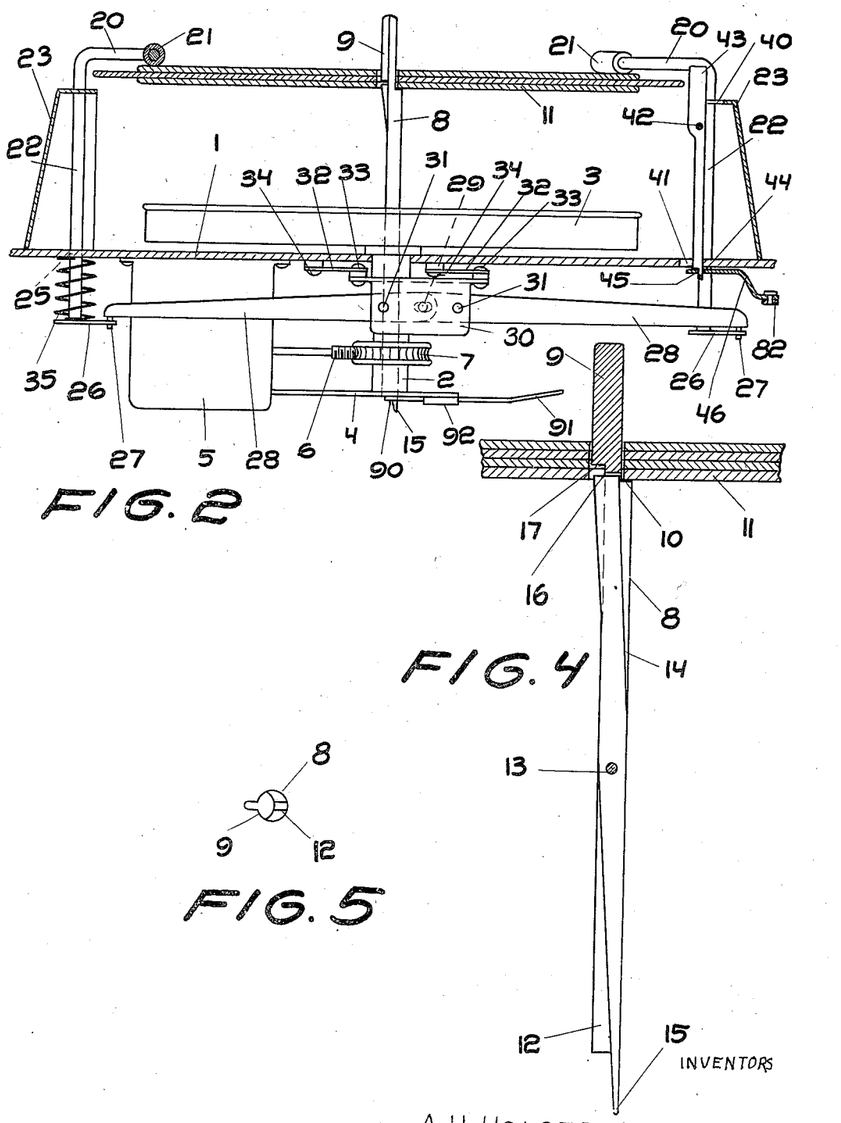
Fig. 2 is a side elevation partly in section on the line II—II in Fig. 1.
Fig. 4 is a longitudinal section on an enlarged scale through a record supporting post.
Fig. 5 is an upper end view of the same supporting post.

A supporting post for the stack of records to be played extends through the hollow shaft 2. In Figure 2 this post is shown to carry three records, viz. a lower record of the small standard size, or 10 inches, an intermediate record of the large standard size, or 12 inches, and an upper record of the small standard size. Furthermore a record of the small standard size is shown to rest on the turntable.

The supporting post is constructed as follows (compare Figures 4 and 5): A relatively long cylindrical rod 8 is provided at its upper end with a short extension 9 which is offset with respect to the part 8 so as to form thereon a shoulder or flat 10 on which a record 11 threaded on the extension 9 can rest. The post 8 is provided with a longitudinal slot 12 extending from the lower end thereof and a short distance into the extension 9. On a pin 13 in this slot there is pivotally mounted a two-armed lever 14 the tapering lower arm 15 of which projects at the end of the post 8 and the upper arm 16 of which has a width substantially equal to the diameter of the post 8. This upper arm 16 of the lever 14 projects above the flat or shoulder 10 a distance which is somewhat smaller than the thickness of a record.

When the lever 14 is rocked clockwise about its pin 13 from the position shown in Figure 4 the lowermost record 11 of the stack is displaced laterally, the extension 9 for this purpose being cut away somewhat at its lower end, as shown at 17, while the remaining records are retained by the extension 9. When the lever 14 has been rocked so that its upper arm 16 registers with the rod 8 the centre hole of the record 11 also registers with the rod and the record falls down along the same to the turntable. When the lever 14 returns to the normal position shown in Figure 4 the whole set of records moves down until that record which is now the lowest rests on the shoulder 10 ready to be released.

The small shoulder or flat 10 cannot alone hold a record or a set of records in horizontal position. For this purpose additional supporting means are needed and in the embodiment shown these comprise two arms 20 which are preferably spring-actuated and engage the upper side of the stack at about diametrically opposite points.

Figure 3:
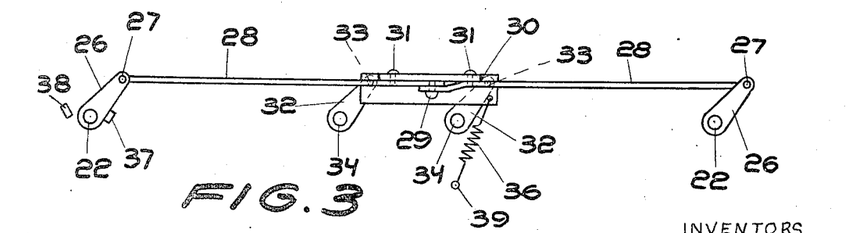
Fig. 3 is a view from below showing a connection mechanism between arms serving to support the stack of records.

The arms 20 which are horizontal and preferably bent at an angle may be provided at their outer ends with a suitable covering, for instance hard rubber sleeves 21, 21 or the like. Each arm 20 is carried by a vertical shaft 22 with which it may be integral, as shown. The shafts 22 are journalled as follows: On the upper side of the platform 1 two casings or uprights 23, 23 are mounted at diametrically opposite points of the turntable and spaced sufficiently to allow a large record to be deposited on the turntable. In the upper wall each casing is provided with a hole 24 and right under this hole a similar hole 25 is made in the platform 1. The shafts 22 extend through these holes which thus guide the shafts and form bearings for the same. On that end of each shaft 22 which projects on the underside of the platform 1 a short horizontal arm 26 is mounted. The free end of this arm is provided with a bore which is engaged by a vertical pin 27 on one end of a bar 28. The two bars 28 extend in the direction towards each other under the platform 1 and are pivotally connected at their ends by means of a horizontal pin 29. At a point remote from the pin 29 each bar 28 is pivoted also on a horizontal pin 31 mounted on an angle iron 30. The angle iron 30 is carried by two horizontal arms 32 which are pivotally connected to the angle iron at their one ends 33 and to the platform 1 at their other ends 34 (compare also Figure 3).

The above described connection mechanism between the shafts 22 permits both rotational and axial displacement of the shafts and ensures that each movement of one of the shafts is also performed by the other shaft.

Surrounding the left shaft 22 (Figure 2) and inserted between the underside of the platform 1 and the arm 26 is a cylindrical spiral spring 35 which tends to move the shafts 22 downwards so that the horizontal arms 20 at the upper ends of the shafts are urged against the uppermost record of the stack and hold the stack in horizontal position. Another spring may suitably be inserted between the movable system interconnecting the shafts 22 and a stationary part of the mechanism which spring tends to retain said movable system in that of two end positions defined by abutments 37 and 38 (Figure 3) which the said system just occupies. According to Figure 3 such a spring 36 is arranged between the angle iron 30 and a screw 39 fixed to the platform 1.

The right hand casing or upright 23 (Figures 1 and 2) is provided with a rectangular recess 40 in its upper wall and the platform 1 has a similar rectangular aperture 41. Through these apertures extends a two-armed lever pivoted in the casing 23 on a horizontal pin 42. The upper end 43 of this lever which has a somewhat greater width than the remaining part of the lever is located adjacent the edge of the large records in the stack supported above the turntable. The other arm 44 of the lever extends through the aperture 41 in the platform 1 and engages a square hole 45 in a link 46 (compare also Figures 7–10) for a purpose to be described later.

The pick-up or tone arm 50 (hereinafter referred to as the "pick-up arm") with its sound box or pick-up 51 (Figures 1 and 6) is supported on the upper side of the platform 1 by a cup-shaped casing 52 and is pivoted for vertical swinging movement on a horizontal pin 53 at the free ends of a substantially U-shaped member 54 which is fixed to the upper end of a hollow shaft 55 rotatably mounted in the casing 52. In the hollow shaft 55 a pin 56 is slidable on which the pick-up arm rests and by which it may be raised and lowered by being rocked about the pin 53.

The movements of the pick-up arm as well as the changing of the records are effected by a curve mechanism mounted on the underside of the platform 1 below the cup-shaped casing 52 and preferably adapted to be driven from the turntable by means of a friction disc although other driving means of course may be used.

Figure 6:
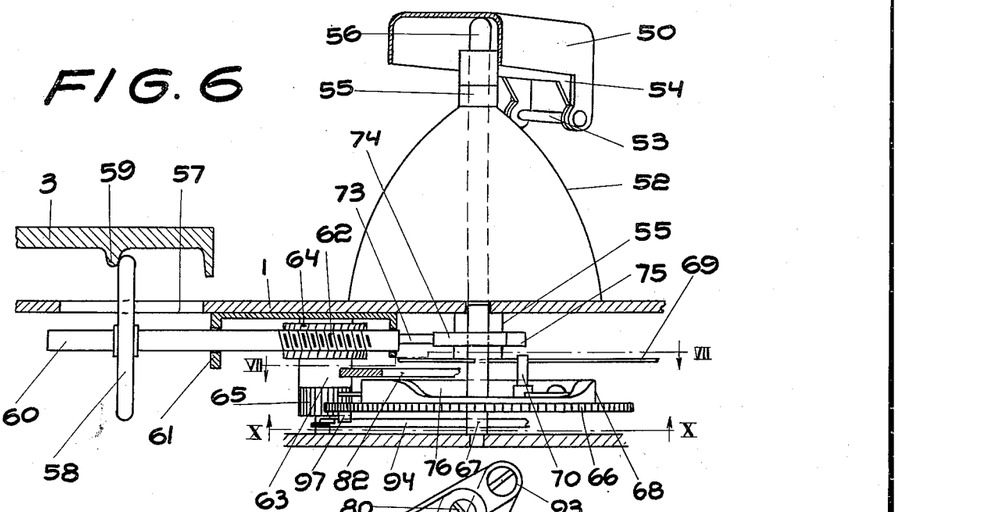
Fig. 6 is a section on the line VI—VI in Fig. 1 on an enlarged scale.

In the embodiment shown in the drawings the platform 1 is provided with a square aperture 57 under the turntable and near the edge of the same through which aperture a friction disc 58 partly projects. On its underside near the edge the turntable 3 is provided with a circular ridge 59 (Figure 6) adapted to coact with the friction disc 58. The latter is mounted on a horizontal shaft 60 which is displaceable axially in a supporting bracket 61 and is provided with a worm 62 meshing with a worm wheel 64 which is mounted on a vertical shaft 63. The shaft 63 is formed with a pinion 65 meshing with a large gear 66 which is mounted on a shaft 67. The upper side of the gear 66 carries a cam in the form of a circular flange 68 extending around the gear at some distance from its edge. The cam is provided with a recess 76. On the top of the cam 68 slides the above mentioned pin 56 which is mounted in the hollow shaft 55 of the pick-up arm. The shaft 60 of the friction disc 58 carries a pin 73 at one end which pin slides on the periphery of a disc 74 fixed to the shaft 67 of the gear 66. The disc 74 is provided with an indentation, as shown at 75. When the pin 73 slides on the circular periphery of the disc 74 as shown in Figure 6 the friction disc 58 contacts the ridge 59 on the turntable and the gear 66 is therefore driven from the turntable by the disc 58, the worm 62, the worm wheel 64 and the pinion 65. When, however, the gear 66 has been rotated so that the indentation 75 in the periphery of the disc 74 faces the pin 73 the friction disc 58 is no longer urged against the ridge 59 but the pin 73 enters said indentation whereby the cam mechanism is stopped.

The cam mechanism is always at rest during the playing of a record. Upon completion of the playing the cam mechanism is put into action by means of a device which is not shown in the drawings and which at the sudden movement of the pick-up arm occurring when the reproducing needle enters the last convolution of the sound groove on the central part of the record actuates the shaft 60 and displaces the same to the left in Figure 6 so that the friction disc 58 is brought into contact with the ridge 59 and the gear 66 begins to rotate making the pin 73 leave the indentation 75 whereafter the friction disc 58 is held in contact with the ridge 59 by the pin 73 sliding on the circular periphery of the disc 74. This mechanism which is known per se forms no part of the present invention.

Figure 7:
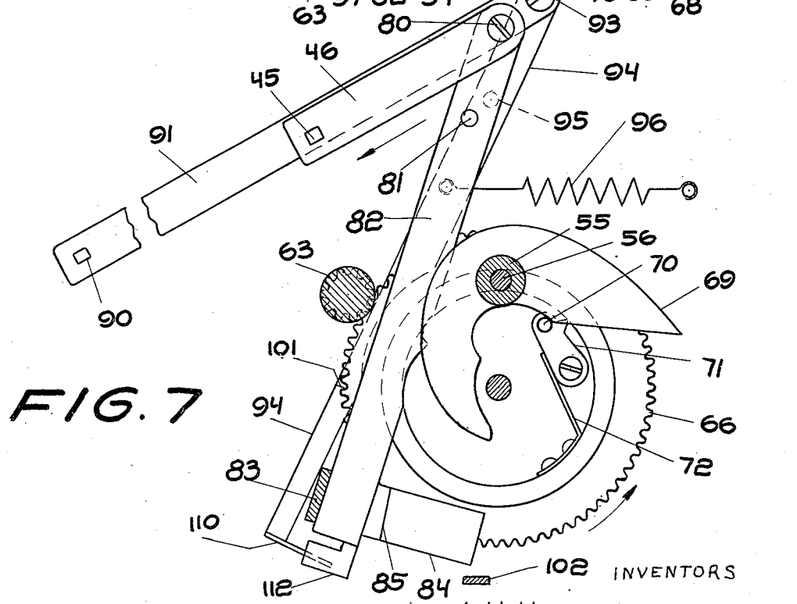
Figs. 7, 8 and 9 are sections on the line VII—VII in Fig. 6, looking in the direction of the arrows and with the mechanism in different operating positions.

On the hollow shaft 55 of the pick-up arm under the platform 1 but above the gear 66 is mounted a cam disc 69 adapted to coact with a pin 70 on the upper side of the gear 66 in order to effect the lateral displacement of the pick-up arm. The pin 70 is fixed to one end of a short arm 71 the other end of which is pivotally mounted on the gear 66. The arm 71 is actuated by a rather strong plate-spring 72 which tends to hold the arm 71 in a position with the pin 70 spaced radially from the centre of the gear 66 as much as possible. The arrangement is such that when the gear 66 rotates in the direction of the arrow in Figures 7 to 9 and the pin 70 engages the cam disc 69 the pick-up arm is first swung outwards, then held for some time in an outer position and finally swung back to playing position. In Figure 7 the cam disc 69 has just reached a position corresponding to the outermost position of the pick-up arm, and in Figures 8 and 9 the cam disc 69 has been rotated back so that the pick-up arm is in position for playing a small record and a large record, respectively.

The cam disc 69 is so shaped that the pin 70 always swings the pick-up arm 50 outwards from the centre of the turntable through an angle sufficient to permit a large record to be deposited on the turntable. If during the continued rotation of the gear 66 the pin 70 is free to actuate the cam disc 69 along the entire active curvature thereof the pick-up arm 50 will be returned from the outermost position to a position in which the reproducing needle is located above the first convolutions of the sound groove of a record of the small size. However, as mentioned above the talking machine is intended also for playing records of the large size, and in order to obtain in such case that the pick-up arm 50 is returned to a position in which the reproducing needle is located above the first convolutions of the sound groove of the large record the above mentioned lever 43, 44 adjacent the side of the stack of records is adapted to actuate the mechanism for effecting the movements of the pick-up arm in the manner now to be described.

Figures 8, 9:
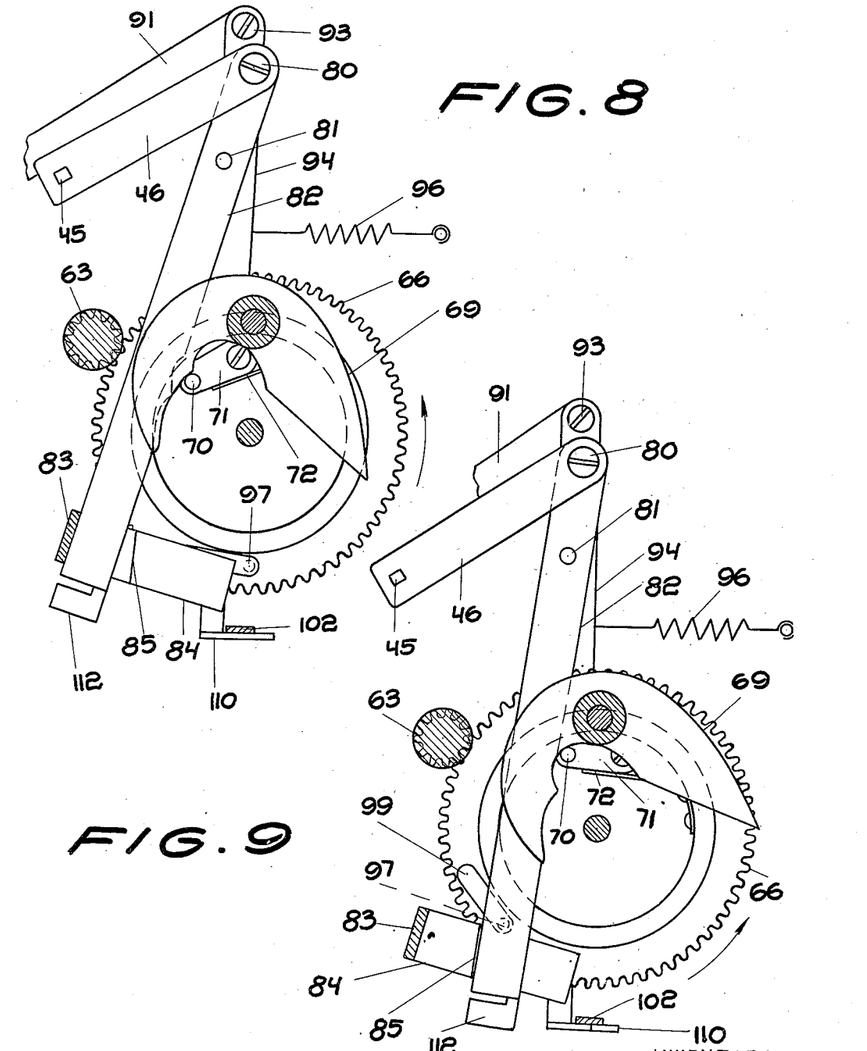

As previously mentioned the lower arm 44 of the lever 43, 44 projects through the aperture 41 in the platform 1 and engages a square hole 45 at one end of the link 46 the other end of which is pivoted at 80 on one end of a two-armed lever 82 which is pivoted on a pin 81 on the underside of the platform 1 (compare also Figures 7 to 9).

The lever 82 normally occupies the inoperative position shown in Figure 7 in which its free end abuts against a vertical part 83 of a bracket carried by the platform 1 the horizontal part 84 of which is provided with a notch 85. When the lever 82 occupies this position the pin 70 at the rotation of the gear 66 is free to actuate the cam disc 69 along its entire active curvature which means that the pick-up arm 50 will be returned from its outermost position to a position for playing a record of the small size (Figure 8).

If, however, the lever 43, 44 is actuated by a released large record at the lateral movement thereof it displaces the link 46 in the direction of the arrow in Figure 7 whereby the lever 82 is rocked counter-clockwise and its outer end moves down by gravity in the notch 85 on the part 84.

In this position the lever 82 is in the path of travel of the pin 70 on the gear 66 so that the pin 70 after having swung the pick-up arm 50 outwards and during the continued movement along the curved edge of the cam disc 69 engages the lever 82 (Figure 9) in the same moment as the pick-up arm 50 has been returned inwards through an angle that locates the reproducing needle above the first convolutions of the sound groove of the deposited large record whereafter the pin 70 follows the edge of the lever 82 which is locked by the notch 85, the spring 72 yielding and the arm 71 being turned inwards.

The tapering end 15 of the lever 14 which is pivoted in the supporting post 8 projects through the plate 4 (Figure 2) and engages a hole 90 in one end of a link 91 which is guided on the plate 4 by means of a guide member 92. The other end of the link 91 is pivotally connected at 93 to one end of a two-armed lever 94 which is pivoted on a vertical pin 95 under the gear 66. The lever 94 is connected to one end of a spring 96 the other end of which is connected to a stationary part of the mechanism. This spring 96 tends to hold the lever 94 in the position shown in Figure 9 (corresponding to the position of the same lever shown in dotted lines in Figure 10), i. e., with the free arm approached towards the shaft 67 of the gear 66 as much as possible and with the outer end engaging an abutment 102. On the underside of the gear 66 a pin 97 projects which is guided in a bore 98 in the gear and is carried by a plate-spring 99 fixed to the upper side of the gear (Figure 9). When the gear 66 rotates in the direction of the arrow in Figure 10 and the pin 97 engages the edge of the lever 94 said lever is rocked counter-clockwise while the pin 97 slides along the edge of an arcuate recess 100 in lever 94 and the spring 96 is stretched. At the end of the arcuate recess 100 material has been removed from the underside of the lever 94 so as to form a shoulder 101 beyond which the arm 94 is no longer actuated by the pin 97, as will be best understood from the section shown in Figure 11. Therefore, when during the rotation of the gear 66 the pin 97 has reached the position shown in dotted lines in Figure 10 the stretched spring 96 quickly returns the arm 94 to the initial position determined by the abutment 102 and shown in dotted lines. As a result hereof the link 91 is displaced to the right in Figure 10, i. e., to the left in Figure 2, and the lever 14 in the supporting post 8 is turned clockwise (Figure 2) whereby the lowermost record in the stack is given a push so that it moves laterally and is released from the stack to fall down to the turntable. It is important that a sudden or shock-like lateral movement be imparted to the record to be released. This ensures that a record of the large standard size will always actuate the lever 43, 44 irrespective of small variations in the diameter of the central apertures of the records. If the lateral displacement is too slow it might happen that at the release of a large record with a worn out central aperture the lever 82 is not displaced enough to be locked by notch 85 and the pick-up arm therefore is returned inwards to a position for playing a small record instead of a large one.

Adjacent the gear 66 a lever 104 is pivotally mounted on a bracket 103 projecting from the underside of the platform 1. This lever may be shifted by hand from the position shown in full lines in Figure 10 to the position shown in dotted lines in which latter position the end 105 of the lever is in the path of travel of the pin 97 at the edge of the control lever 94 and at the rotation of the gear 66 depresses said pin 97 in its bore 98 against the action of the plate-spring 99 so that the pin 97 does not engage the edge of the lever 94 but enters below the lever without moving it. Accordingly no change of records occurs and the playing of the record on the turntable is repeated. An equivalent to the means just described would be a manually operable locking device for loocking the lever 94 against displacement by the pin 97. In such case the pin 97 should be yieldingly mounted on the gear 66.

Figures 10, 11, 12, 13:
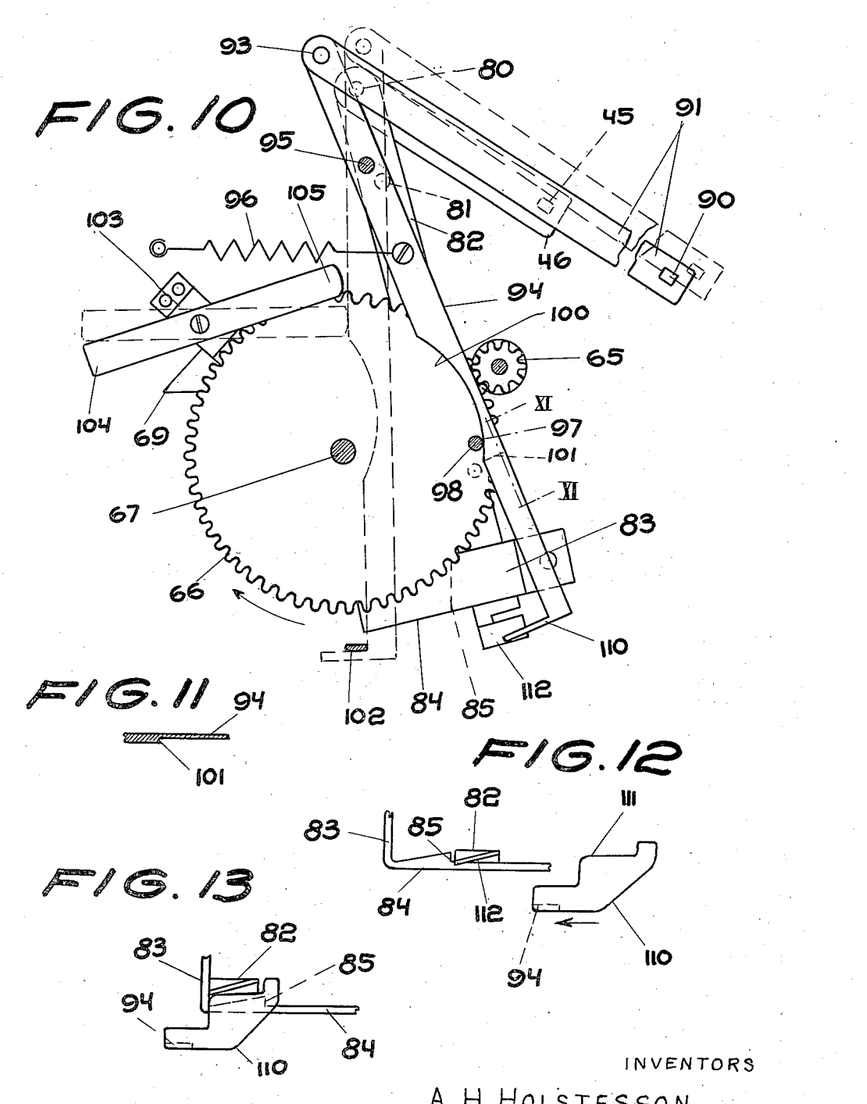
Fig. 10 is a section on the line X—X in Fig. 6, looking in the direction of the arrows and with the mechanism in an operating position corresponding to that in Fig. 7.
Fig. 11 is a longitudinal section through a control lever on the line XI—XI in Fig. 10.
Figs. 12 and 13 are end views of the control lever shown in Fig. 11 and another control lever coacting therewith, the said levers being shown in different operation positions.

At its free end and substantially at right angles thereto the lever 94 carries a plate 110 provided with an inclined upper edge 111, as shown in Figures 12 and 13 which are end views of the levers 82 and 94 in positions corresponding to those in Figures 9 and 10, respectively. The free outer end of the lever 82 carries a plate 112 which is also slightly inclined and adapted to coact with the inclined edge 111 of the plate 110. As mentioned above the deposition on the turntable of a large record causes the lever 82 to be moved to a position in which it is prevented to return by engaging the notch 85 on the part 84. The plate 110 at the end of the lever 94 serves to return the lever 82 to the initial position after the said lever has performed its function during the rotation of the gear 66. With reference to Figures 12 and 13 this is effected thereby that at the displacement of the lever 94 by the pin 97 in the direction of the arrow the inclined edge 111 of the plate 110 engages the plate 112 on the lever 82 and raises this lever out of the notch 85, whereafter it is returned to the initial position.

Figures 14, 15, 16:
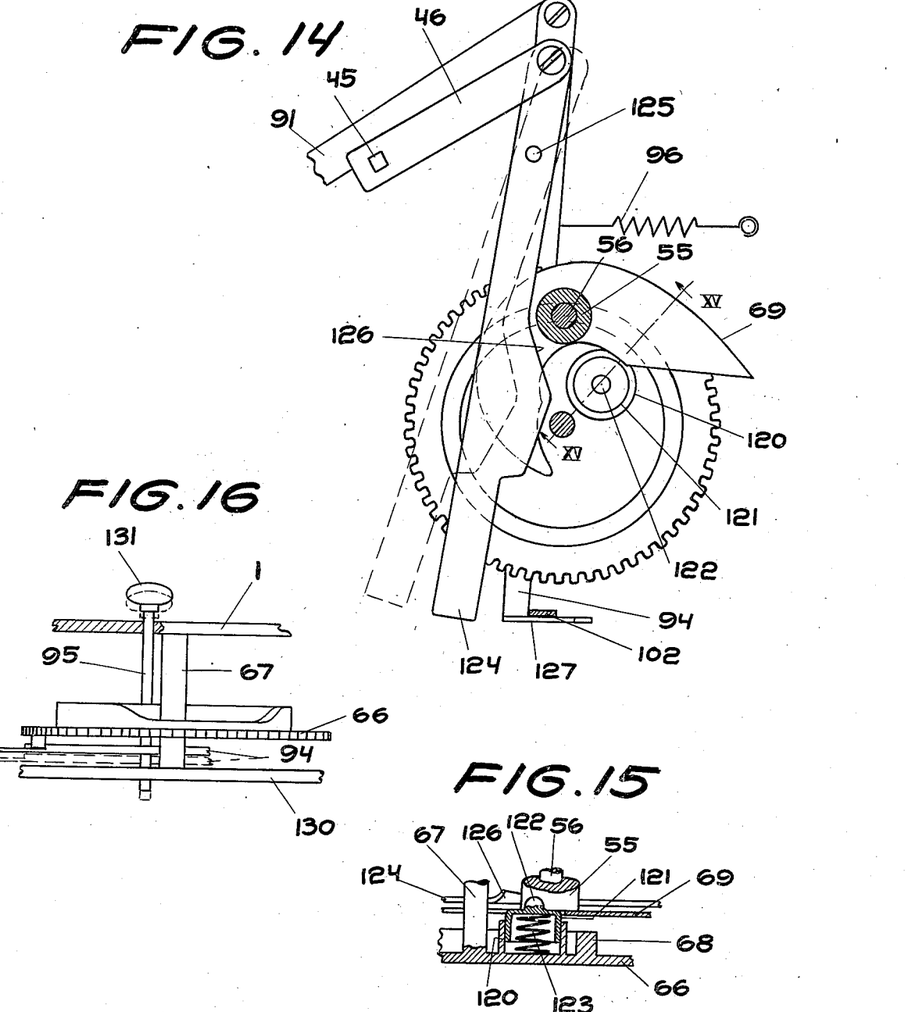
Fig. 14 is a section similar to that shown in Fig. 7 through a modified mechanism.
Fig. 15 is a section on the line XV—XV in Fig. 14.
Fig. 16 shows a modification of a repeating mechanism.

A modification of the mechanism for suiting the inward movement of the pick-up arm to the size of the released record is shown in Figures 14 and 15.

On the gear 66 a relatively thick cylindrical pin 121 is mounted in a vertical sleeve or bushing 120 in which it is axially displaceable. The pin is hollow and has an upper extension 122 of reduced diameter, the extension being provided with a rounded off upper end. Within the sleeve or bushing 120 a cylindrical screw spring 123 is inserted between the upper side of the gear 66 and the pin 121, and the spring tends to hold the pin 121 in the upper end position shown in Figure 15 which preferably is defined by an abutment not shown so that the pin cannot be thrown out of the sleeve 120. In this end position the upper side of the thick part 121 of the pin is substantially on a level with the upper side of the cam disc 69 which is fixed to the shaft 65 of the pick-up arm and actuates said cam disc at the rotation of the gear 66. The arrangement is such that when the thick part 121 of the pin is free to actuate the cam disc 69 along the entire active curvature thereof the pick-up arm is returned from the outermost position to a position for playing a small record. If, however, a large record has been deposited on the turntable and accordingly the lever 43, 44 at the side of the stack has been actuated a two-armed lever 124 which is pivotally mounted on a pin 125 above the cam disc 69 is moved by the link 46 from an inoperative position shown in dotted lines in Figure 14 to an operative position shown in full lines. In this operative position an edge 126 of the lever projects substantially radially over the gear 66 in the path of travel of the reduced part 122 of the pin. When during its rotation the gear 66 has reached the position in which the pick-up arm has been returned inwards by the cam disc 69 enough for playing a large record the reduced part 122 of the pin has also reached the edge 126 which is bent upwards as shown in Figure 15. At the continued rotation of the gear 66 the reduced part 122 of the pin enters below the lever 124 whereby it is depressed against the action of the spring 123 and is held depressed by the lever 124. Consequently the thick part 121 of the pin leaves the edge of the cam disc 69 and the inward movement of the pick-up arm ceases. The returning of the lever 124 to the initial position may be effected in the same manner as described in connection with the corresponding element 82 in Figures 7–10, i. e., by the lever 94 at its displacement by the pin 97, said lever 94 being for instance provided with a hook-like part 127 at its free outer end for engaging the lever 124.

A modification of the repeating mechanism is shown in Figure 16. The shaft 95 carrying the lever 94 is mounted axially displaceable in bearings in the platform 1 and in a lower supporting plate 130. On the upper end of this shaft which projects through the platform 1 an operating knob 131 is mounted. The shaft normally occupies its upper end position shown in full lines in Figure 16 in which the lever 94 is in the path of travel of the pin 97 on the underside of the gear 66 and is actuated by said pin for effecting the changing of records. If it is desired to repeat a record just played the knob 131 is depressed so that the shaft 95 with the lever 94 is displaced axially to the lower end position shown in dotted lines in which the lever 94 is no longer in the path of travel of the pin 97. The shaft 95 is preferably actuated by a spring (not shown) which tends to hold the same in the upper end position and it may also be provided with a locking means of some kind which serves to hold the same temporarily in the lower inoperative end position against the action of the spring.

The operation of the above described mechanism is as follows:

The arms 20 are swung outwards from the position shown in full lines in Figure 1 to the position shown in dotted lines. Then the records to be played are threaded in desired sequence on the pin 9 with the lowermost record resting on the shoulder 10. The arms 20 are then raised and returned to the initial position and are thereafter urged against the uppermost record by the spring 35 so that the stack is held in horizontal position.

The motor 5 is started by means of a switch not shown. If it is assumed that that the playing of a record on the turntable has just been completed and that the reproducing needle carried by the pick-up enters the last convolution of the sound groove on said record so that the cam mechanism for effecting the movements of the pick-up arm is started as described above, the cam flange 68 on the top side of the gear 66 will first raise the pick-up arm 50 from the record by means of the pin 56. Thereafter the pin 70 (or 121, Figure 14) engages one leg of the cam disc 69 (the right leg in Figures 7 and 14) and rotates the cam disc counter-clockwise while sliding along the straight edge of the leg. To this rotation of the cam disc 69 corresponds an outward movement of the pick-up arm 50 to the position shown in Figure 1. When the pin 70 (or 121) has reached the end of the straight edge and enters the central arcuate recess of the cam disc 69 it ceases to rotate said cam disc so that the pick-up arm remains a while in the outer position shown. Simultaneously the lever 94 has been moved by the pin 97 on the underside of the gear 66 to the end position shown in full lines in Figures 7 and 10 thereby stretching the spring 96. As the gear 66 continues its rotation the pin 97 reaches the reduced portion of the lever 94 behind the shoulder 101 with the result that the spring 96 quickly moves the lever 94 back to the position shown in full lines in Figures 8, 9 and 14 and in dotted lines in Figure 10 whereby the lever 14 in the supporting post 8 is actuated and gives the lowermost record in the stack a push so that it is displaced laterally and released. If this record is a small one as shown in Figure 2 the lever 43, 44 adjacent the side of the stack is not actuated and no shifting of the control lever 82 (or 124, Figure 14) occurs. Thus at the continued rotation of the gear 66 the pin 70 (or 121) on the top side of said gear is free to actuate the cam disc 69 along the entire active curvature thereof which means that the pick-up arm 50 will be returned inwards to a position with the reproducing needle located above the initial convolutions of the sound groove on the small record just deposited on the turntable. The position of the cam mechanism in this last-mentioned moment is illustrated by Figure 8. As the gear 66 continues its rotation the pin 56 which slides on the circular flange 68 and controls the vertical movement of the pick-up arm enters the recess 76 in said flange whereby the pick-up arm 50 is lowered and the reproducing needle caused to enter the sound groove of the record so that the playing begins. Shortly afterward the gear 66 has completed one revolution. The cam mechanism is then stopped by reason of the end 73 of the shaft of the friction disc 58 entering the indentation 75 in came disc 74.

When the playing of the deposited record is completed the cam mechanism is again put into action, and the operation is now quite the same as described above until the new record which is a large one is given a push so that it is released and falls down to the turntable. At its lateral displacement this record actuates the lever 43, 44 so that the same is rocked and by means of the link 46 moves the lever 82 to the position shown in Figure 9 (or the lever 124 to the position shown in full lines in Fig. 14). The lever 82 (or 124) is now in the path of travel of the pin 70 (or 121, 122) so that this pin after having swung the pick-up arm 50 inwards so as to locate the reproducing needle above the initial convolutions of the sound groove on the large disc now lying uppermost on the turntable engages the edge of the lever 82 (or 124) and is made inoperative.

The returning of the control lever 82 (or 124) to the initial position is effected by the lever 94 when the same is moved by the pin 97 to the position shown in full lines in Figure 10 shortly before the next record is released.

The present invention thus provides a talking machine which plays automatically a plurality of records in succession whereby the records may be of different diameters, the cam mechanism for effecting the movements of the tone arm being automatically shifted so that the tone arm is always returned to the proper position for playing the record deposited on the turntable. The shifting of the cam mechanism is effected by the records when these are displaced in their own planes at the release from the stack, a member being arranged adjacent the side of the stack and adapted to be actuated by the records.

It is to be understood that various modifications may be made in the details of the examples described.

What we claim and desire to secure by Letters Patent is:

1. In a talking machine, a rotatable hollow shaft, a turntable mounted on said shaft, a post extending through the shaft and having an upper extension which is offset with respect to the post for forming thereon a shoulder for supporting a stack of records threaded on said extension, steadying means adapted to engage the upper side of said stack, said means being movable from said operative position to an inoperative position for permitting records to be threaded upon said extension, a lever pivotally mounted in said supporting post and having one end adapted to engage the edge of the central aperture of the lowermost record in said stack and to laterally displace said record to disengage it from said shoulder, a pick-up arm mounted adjacent said turntable, means operative upon completion of the playing of a record for swinging said pick-up arm outwards, said means also rocking said lever into position disengaging said lowermost record whereby the latter drops onto said turntable, and means for then returning the pick-up arm inwards to playing position.

2. In a talking machine, a rotatable shaft, a turntable mounted on said shaft, means for supporting a stack of records above said turntable, said means being of the type which is adapted to release the lowermost record in said stack upon a small lateral displacement of said record, means for laterally displacing the lowermost record of said stack off of said support to release said lowermost record for downward movement toward the turntable, a movable arm carrying a pick-up means, a mechanism adapted to operate upon completion of the playing of a record for moving said movable arm outwards, actuating said record displacing means for releasing a record and returning said movable arm inwards to playing position, and means for controlling said inward movement of said movable arm according to the size of the released record, said means being positioned adjacent the side of said stack outwardly of a relatively large record in said stack but in the path of lateral displacement of a relatively large record and adapted to be actuated by such record at the small lateral displacement thereof but to remain unaffected at the release of a relatively small record.

3. In a talking machine, a rotatable shaft, a turntable mounted on said shaft, means for supporting a stack of records above said turntable, said means being of the type which is adapted to release the lowermost record in said stack upon a small lateral displacement of said record, spring-energized means for effecting sudden lateral displacement of the lowermost record in said stack off of said support for releasing said record for downward movement toward said turntable, a movable arm carrying a pick-up means, a mechanism to operate upon completion of the playing of a record, said mechanism being adapted to move said movable arm outwards to operate said spring-energized record displacing means for releasing a record, and means for controlling said inward movement of said movable arm, said means comprising a member positioned adjacent the side of the stack outwardly of a relatively large record in said stack but in the path of lateral displacement of a relatively large record and adapted to be actuated by such record at the small lateral displacement thereof but to remain unaffected at the release of a relatively small record.

4. In a talking machine, a rotatable shaft, a turntable mounted on said shaft, a post above said turntable, said post having a shoulder for supporting a stack of records at the center thereof above said turntable, means for steadying said stack of records, means for displacing laterally the lowermost record in said stack a small amount off of said shoulder for dropping said record on the turntable, a movable arm carrying a pick-up means, a mechanism adapted to operate upon completion of the playing of a record for moving said movable arm outwards, actuating said record displacing means for releasing a record and returning said movable arm inwards to playing position, and means for controlling said inward movement of said movable arm according to the size of the released record, said means comprising a member positioned adjacent the side of said stack outwardly of a relatively large record in the stack but in the path of lateral displacement of a relatively large record and adapted to be actuated by such record at the small lateral displacement thereof but to remain unaffected at the lateral displacement of a relatively small record.

5. In a talking machine, a rotatable hollow shaft, a turntable mounted on said shaft, a post extending through said shaft and having an upper extension which is offset with respect to the post so as to form thereon a shoulder for supporting a stack of records threaded on said extension, means adapted to engage the upper side of said stack for steadying the same, a movable arm carrying a pick-up means and disposed adjacent said turntable, means including a lever pivotally mounted in said supporting post for displacing laterally the lowermost record in said stack for depositing said record on said turntable, means for moving said movable arm a normal distance inwards into playing position, and means for limiting said inward movement of said movable arm upon release of a relatively large record, said means comprising a member disposed adjacent the side of said stack in the path of lateral displacement of a relatively large record and adapted to be actuated by such record at the lateral displacement thereof but to remain unaffected at the release of a relatively small record.

6. In a talking machine, a platform, a rotatable hollow shaft, a turntable mounted on said shaft and positioned above said platform, a post extending through said shaft and adapted to support a stack of records at the center thereof above said turntable, a two-armed lever pivotally mounted in said post, the upper arm of said lever being adapted to engage the edge of the central aperture of the lowermost record in said stack and the lower arm of said lever being adapted to project on the underside of said platform, a pick-up arm mounted on the upper side of said platform adjacent said turntable, a mechanism mounted mainly on the underside of said platform and adapted to be put into action upon completion of the playing of a record, said mechanism being adapted to move said pick-up arm outwards, actuate the lower arm of said lever for displacing laterally the lowermost record in said stack for depositing said record on the turntable and return said pick-up arm a normal distance inwards to playing position, and means for limiting said inward movement of said pick-up arm upon release of a relatively large record, said means comprising a member disposed adjacent the side of said stack in the path of lateral displacement of a relatively large record and adapted to be actuated by such record at the lateral movement thereof but to remain unaffected at the release of a relatively small record.

7. In a talking machine, a rotatable hollow shaft, a turntable mounted on said shaft, a post extending upwards through the hollow shaft, said post having an upper extension which is offset with respect to the post so as to form thereon a shoulder for supporting a stack of records threaded on said extension, means adapted to engage the upper side of said stack for steadying the same, said means being movable from its operative position to an inoperative position in which it permits the threading of records on said extension, a movable arm carrying a pick-up means, a mechanism adapted to operate upon completion of the playing of a record, said mechanism comprising means for swinging said movable arm outwards and for returning the same inwards and means for displacing laterally the lowermost record in said stack after said outward movement of the movable arm but before the return thereof so as to deposit said record on the turntable, said means including a lever pivotally mounted in said supporting post and adapted to engage the edge of the central aperture of the lowermost record in said stack, and means disposed adjacent the side of said stack in the path of lateral displacement of a relatively large record for controlling the return movement of said movable arm according to the size of the released record, said means being adapted to be actuated by such relatively large record at the lateral displacement thereof but to remain unaffected at the release of a relatively small record.

8. A talking machine according to claim 7, wherein the steadying means comprises a number of spring-actuated arms adapted to engage the upper side of the uppermost record in the stack, said arms being coupled so as to be caused to move in unison.

9. In a talking machine, a rotatable shaft, a turntable mounted on said shaft, a post having a support for supporting a stack of records above said turntable at the center of said stack, means for displacing laterally the lowermost record in the stack off of said support a small amount for releasing said record and dropping the same on the turntable, a movable arm carrying a pick-up means, a mechanism adapted to operate upon completion of the playing of a record for moving said movable arm outwards, actuating said record displacing means for dropping a record on the turntable and returning said movable arm inwards to playing position, said mechanism comprising a movable spring-actuated lever adapted first to be moved in one direction and then to be released so as to return in the opposite direction under the influence of the spring and give a push to said record displacing means, and means for controlling the inward movement of the movable arm according to the size of the released record, said means being positioned adjacent the side of the stack outwardly of a relatively large record in the stack but in the path of lateral displacement of a relatively large record and adapted to be actuated by such record at the small lateral displacement thereof but to remain unaffected at the release of a relatively small record.

10. In a talking machine, a rotatable shaft, a turntable mounted on said shaft, means including a post for supporting a stack of records above said turntable at the center of said stack, means for displacing laterally the lowermost record in said stack a small amount for releasing said record and depositing the same on the turntable, a movable arm carrying a pick-up means, a mechanism adapted to operate upon completion of the playing of a record for moving said movable arm outwards, actuating said record displacing means and returning said movable arm inwards to playing position, said mechanism comprising a rotatable cam member and a pair of pivotally mounted levers, one of said levers being spring-actuated and adapted first to be rocked in one direction by said cam member at the rotation thereof and then to be released for returning in the opposite direction under the influence of its spring and actuate the record displacing means, and the other of said levers being movable from a normal inoperative position to an operative position in which it is adapted to limit said inward movement of said movable arm, and a member positioned adjacent the side of said stack in the path of lateral movement of a relatively large record, said member being operatively connected to said last-mentioned lever and adapted to be actuated by such relatively large record at the small lateral displacement thereof but to remain unaffected at the release of a relatively small record.

11. A talking machine according to claim 10, wherein the lever for limiting the inward movement of the movable arm carrying the pick-up means is adapted to be returned from its operative position to its inoperative position by the spring-actuated lever for causing the lateral displacement of the records when said lever is rocked by the cam member.

12. In a talking machine, a turntable, means including a post provided with a shoulder for supporting a stack of records above said turntable at the center of said stack, a pick-up arm disposed adjacent said turntable, a shaft upon which said pick-up arm is mounted, a cam fixed to said shaft, a rotatable cam member adapted to be rotated upon completion of the playing of a record, resilient driving means on said cam member for actuating said cam on the shaft of said pick-up arm for moving said pick-up arm outwards and returning the same inwards to playing position, means for displacing laterally the lowermost record in said stack for depositing said record on said turntable, means positioned adjacent said stack in the path of lateral displacement of a relatively large record and adapted to be actuated thereby at the lateral displacement thereof but to remain unaffected at the release of a relatively small record, and a movable element operatively connected to said last-mentioned means and adapted to be moved from a normal inoperative position to a position in the path of travel of said resilient driving means for limiting said inward movement of said pick-up arm.

13. In a talking machine, a platform, a rotatable shaft, a turntable mounted on said shaft and positioned above said platform, a motor for driving said turntable, means comprising a post having a shoulder for supporting a stack of records above said turntable at the center of said stack, means for displacing laterally the lowermost record in said stack off of said shoulder a small amount for releasing said record and dropping the same on the turntable, a pick-up arm mounted on the platform adjacent said turntable, a cam mechanism mounted on the underside of said platform, a friction driving means for temporarily driving said cam mechanism from said turntable upon completion of the playing of a record, said cam mechanism being adapted to move said pick-up arm outwards from the played record, actuate said record displacing means for releasing a record and return said pick-up arm inwards to playing position, a lever disposed adjacent the side of said stack outwardly of a relatively large record in said stack but in the path of lateral travel of a relatively large record and adapted to be actuated by a record at the small lateral travel thereof when being released from said stack, and a movable member for limiting the inward movement of said pick-up arm, said member being operatively connected to said lever and adapted to be actuated by the same for limiting the inward movement of said pick-up arm in the case of a relatively large record being laterally displaced for release from said stack.

14. In a talking machine, a rotatable shaft, a turntable mounted on said shaft, means comprising a post provided with a shoulder for supporting a stack of records above said turntable, means for displacing laterally the lowermost record in said stack a small amount for releasing said record and depositing the same on the turntable, a pick-up arm disposed adjacent said turntable, and a mechanism adapted to be put into action upon completion of the playing of a record for moving said pick-up arm outwards, actuating said record displacing means for releasing a record and returning said pick-up arm inwards to playing position, said mechanism comprising a rotatable cam member, a spring-actuated lever adapted first to be rocked in one direction by said cam member at the rotation thereof and then to be released so as to return in the opposite direction under the influence of said spring, means operatively connected to said lever for displacing laterally the lowermost record in the stack at the return of said lever, manually operable means adapted to cooperate with said cam mechanism to prevent it from rocking said spring-actuated lever, and means for controlling said inward movement of said pick-up arm according to the size of the released record, said means being adapted to be actuated by a relatively large record at the small lateral displacement thereof but to remain unaffected at the lateral displacement of a relatively small record.

AXEL HARALD HOLSTENSSON.
SVANTE PHILIP ARVIDIUS.